(12) United States Patent
Zaneboni

(10) Patent No.: US 11,167,834 B2
(45) Date of Patent: Nov. 9, 2021

(54) AIRCRAFT FUSELAGE COMPRISING AT LEAST TWO TRANSPARENT WALLS INTERPOSED BETWEEN AN UPPER PORTION AND A LOWER PORTION OF THE FUSELAGE

(71) Applicant: AIRBUS SAS, Blagnac (FR)

(72) Inventor: Jason Zaneboni, Blagnac (FR)

(73) Assignee: AIRBUS SAS

( * ) Notice: Subject to any disclaimer, the term of this patent is extended or adjusted under 35 U.S.C. 154(b) by 510 days.

(21) Appl. No.: 16/149,427

(22) Filed: Oct. 2, 2018

(65) Prior Publication Data

US 2019/0118925 A1    Apr. 25, 2019

(30) Foreign Application Priority Data

Oct. 25, 2017 (FR) ...................... 17 60071

(51) Int. Cl.
- *B64C 1/12* (2006.01)
- *B64C 1/06* (2006.01)
- *B64C 1/14* (2006.01)

(52) U.S. Cl.
CPC .............. *B64C 1/069* (2013.01); *B64C 1/061* (2013.01); *B64C 1/12* (2013.01); *B64C 1/14* (2013.01); *B64C 1/1476* (2013.01)

(58) Field of Classification Search
CPC ........... B64C 1/069; B64C 1/061; B64C 1/12; B64C 1/14; B64C 1/1476; B64C 1/1484; B64C 1/1492
See application file for complete search history.

(56) References Cited

U.S. PATENT DOCUMENTS

| | | | | |
|---|---|---|---|---|
| 2,680,582 A | * | 6/1954 | Hansen | B64C 1/1476 244/121 |
| 2,701,899 A | * | 2/1955 | Krupp | B64C 1/1476 49/477.1 |
| 8,939,406 B2 | * | 1/2015 | Dopker | B64C 1/069 244/120 |
| 9,708,065 B2 | * | 7/2017 | Sankrithi | B64C 1/00 |
| 2006/0071127 A1 | * | 4/2006 | Wood | B64C 1/1492 244/129.3 |
| 2011/0024564 A1 | | 2/2011 | Wood et al. | |
| 2014/0001311 A1 | * | 1/2014 | Dopker | B64C 1/069 244/120 |
| 2014/0339365 A1 | | 11/2014 | Fujino et al. | |
| 2016/0297528 A1 | * | 10/2016 | Sankrithi | B64D 11/0601 |
| 2016/0304205 A1 | * | 10/2016 | Hussain | B64D 11/0601 |

FOREIGN PATENT DOCUMENTS

| | | |
|---|---|---|
| DE | 201 18 717 U1 | 2/2002 |
| EP | 1 642 824 A2 | 4/2006 |
| GB | 439 645 A | 12/1935 |

* cited by examiner

*Primary Examiner* — Justin M Benedik
(74) *Attorney, Agent, or Firm* — Lerner, David, Littenberg, Krumholz & Mentlik, LLP

(57) ABSTRACT

An aircraft fuselage includes: at least one lower part, at least one upper part, structural connections connecting the lower part and the upper part in joining zones, in each joining zone, at least one space between the lower and upper parts and the structural connections, and a transparent wall for closing off each space.

8 Claims, 2 Drawing Sheets

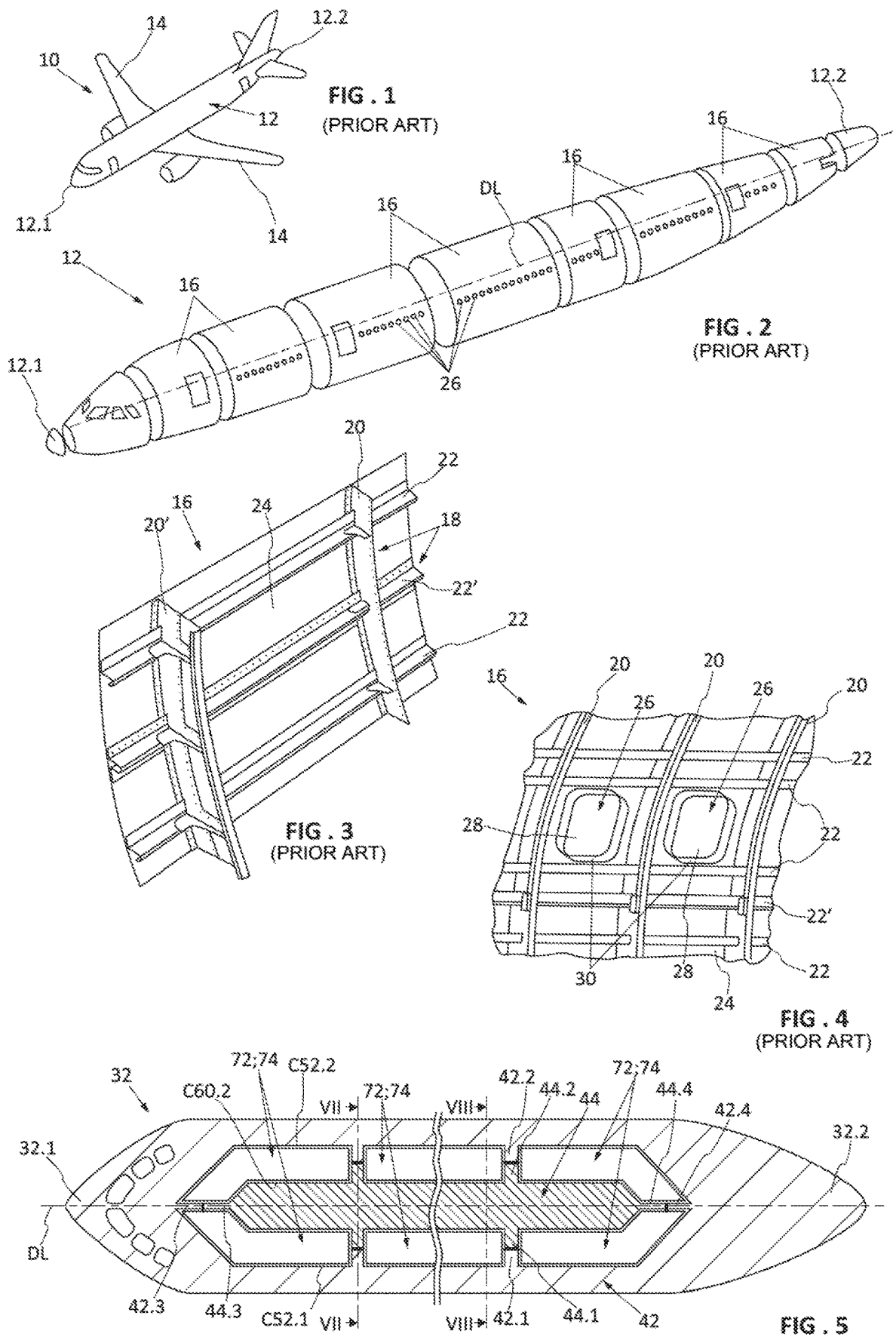

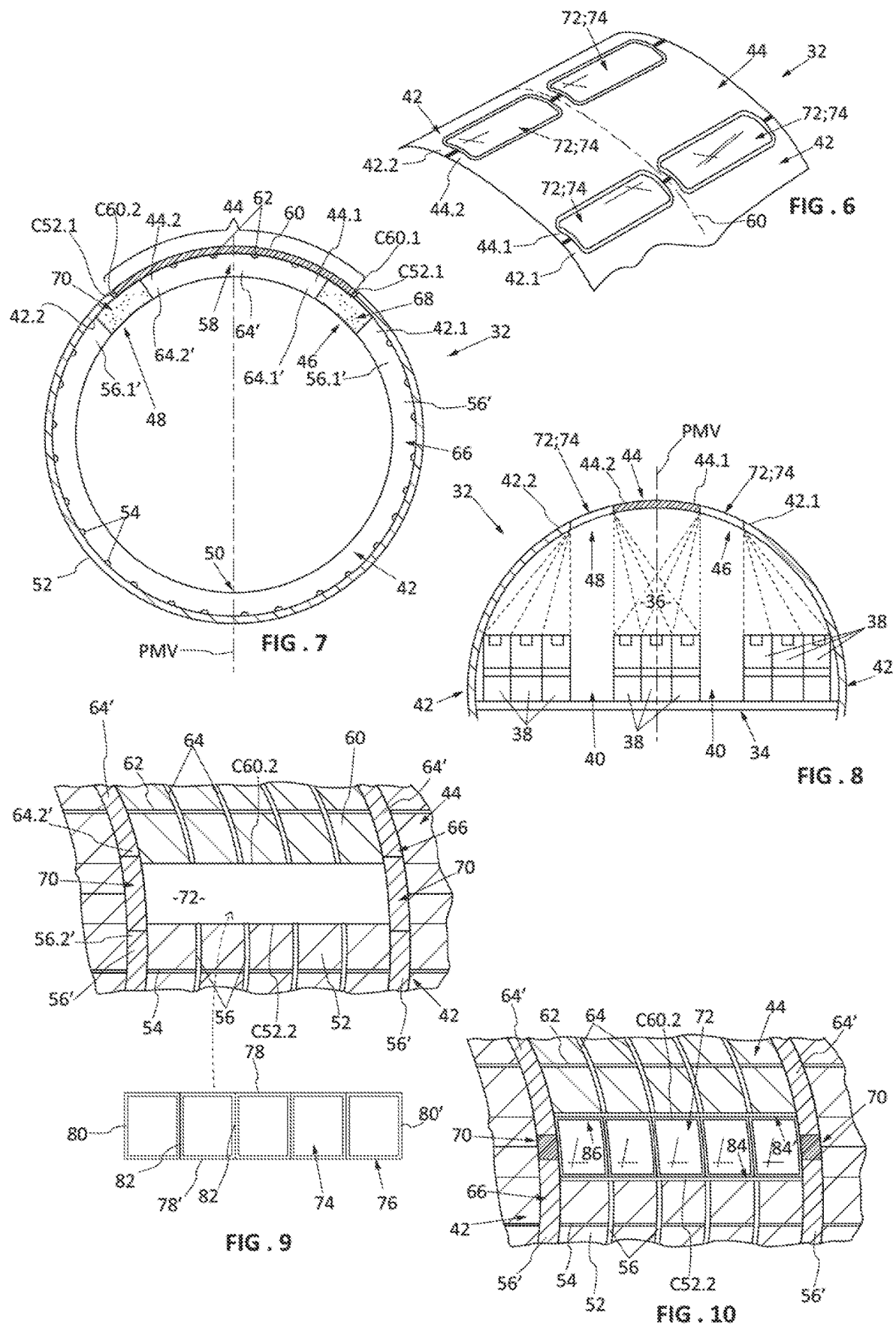

AIRCRAFT FUSELAGE COMPRISING AT LEAST TWO TRANSPARENT WALLS INTERPOSED BETWEEN AN UPPER PORTION AND A LOWER PORTION OF THE FUSELAGE

FIELD OF THE INVENTION

The present application relates to an aircraft fuselage comprising at least two transparent walls interposed between an upper portion and a lower portion of the fuselage.

BACKGROUND OF THE INVENTION

As illustrated in FIG. 1, an aircraft 10 comprises a fuselage 12 which extends from a nose 12.1 to a tail 12.2, and two wings 14 disposed on either side of the fuselage 12.

In the remainder of the description, a longitudinal direction DL is parallel to the longitudinal axis of the fuselage which extends from the nose 12.1 to the tail 12.2. A transverse plane is perpendicular to the longitudinal direction DL.

In one manufacturing technique, the fuselage 12 is made up of a plurality of portions 16 that are disposed end-to-end and connected together.

According to an embodiment visible in FIGS. 3 and 4, each portion 16 comprises:
- a framework 18 which has frames 20 positioned in transverse planes and stringers 22 oriented in the longitudinal direction DL, and
- a skin 24 secured to the framework 18.

Each frame 20 is in the form of a ring which extends around the entire circumference of the fuselage 12. The frames 20 are spaced apart regularly along the fuselage 12. They notably react the forces brought about on the skin 24 of the fuselage in flight by the difference in pressure between the interior and exterior of the fuselage.

Certain frames 20' are reinforced and are positioned at locations where the forces are significant, for example in the joining zones in which the wings 14 and the empennage are joined to the fuselage 12.

Certain stringers 22' are reinforced and referred to as spars.

The skin 24 generally comprises a plurality of juxtaposed panels.

In order to allow light to pass into the interior of the fuselage and the passengers to see the external environment, the skin 24 comprises portholes 26 which are generally aligned along two lateral generatrices that are positioned at the level of the headrests of the seats of the passenger cabin.

In an embodiment illustrated in FIG. 4, each porthole 26 comprises a transparent wall 28, a surround 30 which supports the transparent wall 28 and which is positioned between two successive frames 20 and two successive stringers 22.

With each surround 30 being spaced apart from the frames 20 and the stringers 22, the skin 24 is reinforced around the surround 30 in order to ensure the transmission of forces between the surround 30 and the framework 18.

Since the portholes 26 have to be disposed between two successive frames 20 and two successive stringers 22, they have small dimensions.

BRIEF SUMMARY OF THE INVENTION

Aspects of the present invention may remedy the drawbacks of the prior art.

An embodiment of the invention is an aircraft fuselage comprising a passenger cabin equipped with seats, characterized in that the fuselage comprises:
- at least one lower part which has a right-hand upper edge and a left-hand upper edge,
- at least one upper part which has a right-hand lower edge connected to the right-hand upper edge of the lower part in a first joining zone and a left-hand lower edge connected to the left-hand upper edge of the lower part in a second joining zone,
- structural connections connecting the lower part and the upper part,
- in each first and second joining zone, at least one space between the lower and upper parts and the structural connections, and
- a transparent wall for closing off each space.

An aspect of the invention makes it possible to obtain much larger transparent walls.

According to another feature, the first and second joining zones are positioned above the seats of the passenger cabin.

According to other features:
- the lower part comprises a lower framework, having lower frames disposed in transverse planes distributed regularly in a longitudinal direction, and a lower skin secured to the lower framework,
- the upper part comprises an upper framework, having upper frames disposed in transverse planes distributed regularly in the longitudinal direction, and an upper skin secured to the upper framework, and
- certain lower frames of the lower part are reinforced and positioned in line with reinforced upper frames of the upper part, the reinforced lower frames each comprising a first end connected to a first end of one of the reinforced upper frames by a first connection, and a second end connected to a second end of the reinforced upper frame by a second connection, a reinforced lower frame and a reinforced upper frame connected by the first and second connections forming a structural connection.

According to other features:
- the lower skin has a right-hand upper edge face and a left-hand upper edge face,
- the upper skin has a right-hand lower edge face and a left-hand lower edge face,
- the right-hand upper edge face and left-hand upper edge face, respectively, of the lower skin and the right-hand lower edge face and left-hand lower edge face, respectively, of the upper skin are spaced apart between the structural connections and joined at the structural connections.

According to a first embodiment, for each space, the fuselage comprises a framing structure which has two spars connecting the structural connections when the framing structure is mounted and two uprights connecting the spars, the transparent wall being mounted edge-to-edge on the framing structure.

The framing structure may comprise at least one reinforcement, parallel to the uprights, connecting the spars.

In a second embodiment, (i) at least some of the lower frames interposed between the reinforced lower frames and at least some of the upper frames interposed between the reinforced upper frames and disposed in line with the lower frames pass through each space, (ii) the lower part comprises at least one lower spar which connects two structural connections, (iii) the upper part comprises at least one upper spar which connects two structural connections, (iv) the transparent wall is mounted edge-to-edge on a surround, formed by the lower and upper spars and the structural connections, and is supported by the upper and lower frames.

According to another feature, each transparent wall is equipped with a masking system configured to opacify the transparent wall in an activated state.

According to one embodiment, the masking system comprises an electrochromatic or electro-optical film which is attached to the transparent wall.

A further subject of the invention is an aircraft comprising a fuselage according to the invention.

BRIEF DESCRIPTION OF THE DRAWINGS

Further features and advantages will become apparent from the following description of the invention, said description being given only by way of example, with reference to the appended drawings, in which:

FIG. 1 is a perspective view of an aircraft,

FIG. 2 is a perspective view of portions of an aircraft fuselage, which illustrates one embodiment of the prior art, FIG. 3 is a perspective view of a part of a portion of an aircraft fuselage, which illustrates one embodiment of the prior art, FIG. 4 is a perspective view of a part of a portion of an aircraft fuselage incorporating portholes, which illustrates one embodiment of the prior art, FIG. 5 is a top view of an aircraft fuselage, which illustrates one embodiment of the invention, FIG. 6 is a top view of a part of an aircraft fuselage, which illustrates one embodiment of the invention, FIG. 7 is a cross section on the line VII-VII of the fuselage visible in FIG. 5, FIG. 8 is a cross section on the line VIII-VIII of the fuselage visible in FIG. 5, FIG. 9 is a diagram of a part of an aircraft fuselage, which illustrates a first embodiment of the invention, and FIG. 10 is a diagram of a part of an aircraft fuselage, which illustrates a second embodiment of the invention.

DETAILED DESCRIPTION

FIGS. 5, 7 and 8 show an aircraft fuselage 32 which has an approximately circular section in a transverse plane. However, the invention is in no way limited to this type of section. Thus, the fuselage can have an oblong shape with a large vertical dimension or a large horizontal dimension.

The aircraft comprises a horizontal floor 34 connected to the fuselage 32, the fuselage 32 and the floor 34 delimiting, in the upper part, a passenger cabin 36, inter alia.

The passenger cabin 36 comprises seats 38 that are arranged in a number of rows. In a configuration that is visible in FIG. 8, the seats 38 are separated by two aisles 40 that are parallel to the longitudinal direction DL and symmetric with respect to a vertical midplane PMV (which corresponds to the vertical plane passing through the longitudinal axis). However, this configuration does not limit the invention, which can also be based on a configuration having a single aisle or a greater number of aisles.

The fuselage 32 extends from a nose 32.1 to a tail 32.2 and comprises at least one lower part 42, which has a right-hand upper edge 42.1 and a left-hand upper edge 42.2, and at least one upper part 44 which has a right-hand lower edge 44.1 connected to the right-hand upper edge 42.1 of the lower part 42 in a first joining zone 46, and a left-hand lower edge 44.2 connected to the left-hand upper edge 42.2 of the lower part 42 in a second joining zone 48.

The right-hand and left-hand upper edges 42.1 and 42.2 of the lower part 42 of the fuselage each comprise a rectilinear portion that is oriented parallel to the longitudinal direction DL, front ends that are separated or converge towards a front point 42.3, and/or rear ends that are separated or converge towards a rear point 42.4.

The right-hand and left-hand upper edges 42.1 and 42.2 are substantially symmetric with respect to the vertical midplane PMV.

The right-hand and left-hand lower edges 44.1 and 44.2 of the upper part 44 of the fuselage each comprise a rectilinear portion that is oriented parallel to the longitudinal direction DL, front ends that are separated or converge towards a front point 44.3, and/or rear ends that are separated or converge towards a rear point 44.4.

The right-hand and left-hand lower edges 44.1 and 44.2 are substantially symmetric with respect to the vertical midplane PMV.

The lower part 42 extends around more than half the circumference of the fuselage 32, such that the first and second joining zones 46, 48 are positioned above the seats 38 of the passenger cabin 36. In one configuration, the first and second joining zones 46, 48 are positioned above and vertically in line with the aisles 40 of the passenger cabin 36.

The lower part 42 comprises a lower framework 50 to which a lower skin 52 formed by juxtaposed panels is secured.

The lower framework 50 comprises lower stringers 54 and lower frames 56 that are disposed in transverse planes distributed regularly in the longitudinal direction DL. The lower frames 56 extend around only a part of the circumference, between the right-hand and left-hand upper edges 42.1 and 42.2 of the lower part 42 when they are positioned in transverse planes which intersect the right-hand and left-hand upper edges 42.1 and 42.2 of the lower part 42. Lower frames 56 can extend around the entire circumference of the fuselage 32 when they are positioned in transverse planes which do not intersect the right-hand and left-hand upper edges 42.1 and 42.2 of the lower part 42.

The lower stringers 54 and the lower frames 56 are distributed and dimensioned notably so as to react forces brought about on the lower skin 52 of the lower part 42 in flight by the difference in pressure between the interior and the exterior of the fuselage.

The upper part 44 comprises an upper framework 58 to which an upper skin 60 is secured.

The upper framework 58 comprises upper stringers 62 and upper frames 64 that are disposed in transverse planes distributed regularly in the longitudinal direction DL. The upper frames 64 extend around only a part of the circumference, between the right-hand and left-hand lower edges 44.1 and 44.2 of the upper part 44.

The upper stringers 62 and the upper frames 64 are distributed and dimensioned notably so as to react forces brought about on the upper skin 60 of the upper part 44 in flight by the difference in pressure between the interior and the exterior of the fuselage.

The upper and lower frameworks 50, 58 and the lower and upper skins 52, 60 are metallic and/or made of composite material. The lower and upper skins 52, 60 are opaque walls.

According to the invention, the lower part 42 and the upper part 44 are connected by structural connections 66.

In one embodiment, certain lower frames 56' of the lower part 42 are reinforced and positioned in line with reinforced upper frames 64' of the upper part 44. The reinforced lower frames 56' each comprise a first end 56.1' connected to a first end 64.1' of one of the reinforced upper frames 64' by a first connection 68, and a second end 56.2' connected to a second end 64.2' of the reinforced upper frame 64' by a second connection 70.

Each first and second connection 68, 70 is obtained by any appropriate means, for example by bolting, by riveting, and may comprise at least one interposed part such as a fishplate.

A reinforced lower frame 56' and a reinforced upper frame 64' that are connected by the first and second connections 68 and 70 form a structural connection 66.

The number, distribution and dimensioning of the structural connections 66 are determined so as to ensure the transmission of forces between the lower and upper parts 42, 44.

The fuselage 32 comprises at least one space 72, in each joining zone 46, 48, between the lower and upper parts 42, 44 and the structural connections 66, and a transparent wall 74 for closing off each space 72. Thus, the transparent walls 74 are positioned above the seats 38, notably above and vertically in line with the aisles 40 of the passenger cabin 36.

To this end, the right-hand upper edge face C52.1 (and left-hand upper edge face C52.2, respectively) of the lower skin 52 and the right-hand lower edge face C60.1 (and left-hand lower edge face C60.2, respectively) of the upper skin 60 are spaced apart between the structural connections 66. The right-hand upper edge face C52.1 (and left-hand upper edge face C52.2, respectively) of the lower skin 52 and the right-hand lower edge face C60.1 (and left-hand lower edge face C60.2, respectively) of the upper skin 60 are joined at the structural connections 66, as illustrated in FIGS. 5 and 6.

Depending on the geometry of the lower and upper parts 42, 44, the right-hand and left-hand upper edge faces C52.1, C52.2 of the lower skin 52 and the right-hand and left-hand lower edge faces C60.1, C60.2 of the upper skin 60 can be rectilinear, curved or follow a profile including a combination of rectilinear and/or curved portions. In one configuration, the right-hand upper edge face C52.1 (and left-hand upper edge face C52.2, respectively) of the lower skin 52 and the right-hand lower edge face C60.1 (and left-hand lower edge face C60.2, respectively) of the upper skin 60 are parallel.

In a first embodiment that is visible in FIG. 9, the space 72 is free of any structural part of the fuselage 32. Thus, the lower frames 56 interposed between the reinforced lower frames 56' do not extend beyond the right-hand and left-hand upper edge faces C52.1 and C52.2 of the lower skin 52, and the upper frames 64 interposed between the reinforced upper frames 64' do not extend beyond the right-hand and left-hand lower edge faces C60.1 and C60.2 of the upper skin 60.

In this first embodiment, for each space 72, the fuselage 32 comprises a framing structure 76 which comprises two parallel spars 78, 78' (oriented in the longitudinal direction DL when the framing structure 76 is mounted) and two uprights 80, 80' connecting the ends of the spars 78, 78'.

The spars 78, 78' are dimensioned such that the uprights 80, 80' are pressed against the structural connections 66. Thus, the spars 78, 78' connect the structural connections 66 when the framing structure 76 is mounted.

When the framing structure 76 is mounted, the lower frames 56 interposed between the reinforced lower frames 56' and the upper frames 64 interposed between the reinforced upper frames 64' are connected to the framing structure 76.

The framing structure 76 may comprise at least one reinforcement 82 parallel to the uprights 80, 80' interposed between the uprights 80, 80' connecting the spars 78, 78'.

The transparent wall 74 is mounted edge-to-edge on the framing structure 76.

In a second embodiment that is visible in FIG. 10, at least some of the lower frames 56 interposed between the reinforced lower frames 56' and at least some of the upper frames 64 interposed between the reinforced upper frames 64' and disposed in line with the lower frames 56 pass through each space 72.

In this second embodiment, the lower part 42 comprises, at the right-hand and left-hand upper edge faces C52.1 and C52.2, at least one upper spar 84 which connects two structural connections 66. In one configuration, the lower part 42 comprises, at the right-hand and left-hand upper edge faces C52.1 and C52.2, an upper spar 84 between each pair of structural connections 66.

The upper part 44 comprises, at the right-hand and left-hand lower edge faces C60.1 and C60.2, at least one lower spar 84' which connects two structural connections 66. In one configuration, the upper part 44 comprises, at the right-hand and left-hand upper edge faces C60.1 and C60.2, a lower spar 84' between each pair of structural connections 66.

The upper and lower spars 84, 84' are crossed by the lower frames 56 and the upper frames 64, which are connected to said upper and lower spars 84, 84'.

The transparent wall 74 is mounted edge-to-edge on the surround 86 formed by the lower and upper spars 84, 84' and the structural connections 66, and is supported by the upper and lower frames 56, 64.

The transparent wall 74 can be made in one piece or be made up of several juxtaposed sheets.

Each transparent wall 74 is made for example of glass or polycarbonate. Each of said transparent walls can be equipped with a masking system configured to opacify the transparent wall 74 in an activated state. Each masking system is actuable remotely.

In one embodiment, the masking system comprises an electrochromatic or electro-optical film which is attached to the transparent wall 74 and which can be controlled by applying an electrical voltage to its terminals.

In one assembly technique, each lower and upper part 42, 44 comprises a plurality of portions that are disposed end-to-end and connected together.

In a first assembly method, the lower and upper parts 42, 44 are assembled separately in that, for each of them, the different portions thereof are connected. Next, the upper and lower parts 42, 44 are connected by virtue of the first and second connections 68, 70. Finally, the transparent walls 74 are fitted at the spaces 72.

In a second assembly method, each portion of the lower part 42 is assembled with the corresponding portion of the upper part 44 by virtue of the first and second connections 68, 70, so as to obtain a fuselage portion. Next, the different fuselage portions are disposed end-to-end and assembled. Finally, the transparent walls 74 are fitted at the spaces 72.

The invention makes it possible to obtain wider transparent walls that are positioned above the passengers' heads.

The invention is not limited to the above-described embodiments. Thus, it is possible for the lower and upper parts 42 and 44 not to extend along the entire length of the fuselage but only along a portion of the fuselage or certain portions of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage comprising a passenger cabin equipped with seats, wherein the fuselage comprises:
at least one lower part having a right-hand upper edge, a left-hand upper edge, a lower framework, having lower frames disposed in transverse planes distributed regularly in a longitudinal direction, and a lower skin secured to the lower framework and having a right-hand upper edge face and a left-hand upper edge face;
at least one upper part having a right-hand lower edge connected to the right-hand upper edge of the lower part in a first joining zone and a left-hand lower edge connected to the left-hand upper edge of the lower part in a second joining zone, the upper part comprising an upper framework, having upper frames disposed in transverse planes distributed regularly in the longitudinal direction;
certain lower frames of the lower part being reinforced and positioned in line with reinforced upper frames of the upper part, the reinforced lower frames each comprising a first end connected to a first end of one of the reinforced upper frames by a first connection, and a second end connected to a second end of the reinforced upper frame by a second connection, one or more reinforced lower frames and one or more reinforced upper frames connected by the first and second connections, forming one or more structural connections connecting the lower part and the upper part;
the at least one upper part further comprising an upper skin secured to the upper framework and having a right-hand lower edge face and a left-hand lower edge face, the right-hand upper edge face and left-hand upper edge face, respectively, of the lower skin and the right-hand lower edge face and left-hand lower edge face, respectively, of the upper skin being spaced apart between the one or more structural connection and joined at the one or more structural connection,
the fuselage further comprising:
in each first and second joining zone, at least one space between the lower and upper parts and the one or more structural connections positioned above the seats of the passenger cabin, the space being free of any structural part of the fuselage;
for each of the at least one space, a transparent wall for closing off said at least one space; and
for each space, a framing structure having two spars connecting the one or more structural connections when the framing structure is mounted and two uprights connecting the spars, the transparent wall being mounted edge-to-edge on the framing structure.

2. The aircraft fuselage according to claim 1, wherein the framing structure comprises at least one reinforcement parallel to the uprights connecting the spars.

3. The aircraft fuselage according to claim 1, further comprising lower frames interposed between the reinforced lower frames, the lower frames not extending beyond the right-hand and left-hand upper edge faces of the lower skin, and upper frames interposed between the reinforce upper frames, the upper frames not extending beyond the right-hand and left-hand lower edge faces of the upper skin.

4. The aircraft fuselage according to claim 3, wherein, when the framing structure is mounted, lower frames interposed between the reinforced lower frames and upper frames interposed between the reinforced upper frames are connected to the framing structure.

5. The aircraft fuselage according to claim 1, wherein the spars are dimensioned such that the uprights are pressed against the one or more structural connections, and
wherein the spars connect the one or more structural connections when the framing structure is mounted.

6. The aircraft fuselage according to claim 1, wherein each transparent wall is equipped with a masking system configured to opacify the transparent wall in an activated state.

7. The aircraft fuselage according to claim 6, wherein the masking system comprises an electrochromatic or electro-optical film attached to the transparent wall.

8. An aircraft comprising a fuselage according to claim 1.

* * * * *